US011209797B2

(12) United States Patent
Mikado et al.

(10) Patent No.: US 11,209,797 B2
(45) Date of Patent: Dec. 28, 2021

(54) NUMERICAL CONTROL MACHINE TOOL BACKLASH DIAGNOSIS AND MAINTENANCE SYSTEM

(71) Applicant: NIKKEN KOSAKUSHO WORKS, LTD., Daito (JP)

(72) Inventors: Susumu Mikado, Nara (JP); Masatsugu Murata, Osaka (JP)

(73) Assignee: NIKKEN KOSAKUSHO WORKS, LTD., Daito (JP)

( * ) Notice: Subject to any disclaimer, the term of this patent is extended or adjusted under 35 U.S.C. 154(b) by 216 days.

(21) Appl. No.: 16/654,247

(22) Filed: Oct. 16, 2019

(65) Prior Publication Data
US 2020/0209829 A1 Jul. 2, 2020

(30) Foreign Application Priority Data

Dec. 26, 2018 (JP) .............................. JP2018-242100

(51) Int. Cl.
G05B 19/4063 (2006.01)
(52) U.S. Cl.
CPC ............... G05B 19/4063 (2013.01); G05B 2219/41032 (2013.01); G05B 2219/50185 (2013.01)
(58) Field of Classification Search
None
See application file for complete search history.

(56) References Cited

U.S. PATENT DOCUMENTS

| 5,767,645 | A | 6/1998 | Park |
| 6,615,103 | B2 | 9/2003 | Fujishima et al. |
| 6,836,698 | B2 | 12/2004 | Fujishima et al. |
| 2003/0033105 | A1* | 2/2003 | Yutkowitz ............ G05B 19/404 702/105 |
| 2004/0163562 | A1* | 8/2004 | Lewis, Jr. ........... B41F 33/0081 101/485 |
| 2012/0263851 | A1 | 11/2012 | Yamamoto |
| 2013/0211598 | A1* | 8/2013 | Fujii ..................... G05B 11/01 700/275 |

(Continued)

FOREIGN PATENT DOCUMENTS

EP 2 708 322 3/2014
JP 59-072509 A 4/1984

(Continued)

OTHER PUBLICATIONS

English translation of Takahashi Japanese Patent Publication No. JPH10180591 (1998).*

(Continued)

Primary Examiner — Bernard G Lindsay
(74) Attorney, Agent, or Firm — W. F. Fasse

(57) ABSTRACT

A numerical control system diagnoses and maintains a numerical control machine tool by measuring backlash and downloading a backlash correction value to the numerical control machine tool. The system includes a host computer device that downloads a monitor management program to a numerical controller of the numerical control machine tool, collects numerical control information input/output between the numerical controller and a servomotor, analyzes the numerical control information, and diagnoses the numerical control machine tool.

16 Claims, 10 Drawing Sheets

(56) References Cited

U.S. PATENT DOCUMENTS

| | | | | |
|---|---|---|---|---|
| 2014/0039666 A1* | 2/2014 | Kim | ................ | G05B 19/404 |
| | | | | 700/174 |
| 2015/0277423 A1* | 10/2015 | Kondo | ................ | G05B 19/402 |
| | | | | 700/193 |
| 2020/0004220 A1* | 1/2020 | Sarup | ................ | G05B 19/4062 |

FOREIGN PATENT DOCUMENTS

| | | |
|---|---|---|
| JP | 02-036052 A | 2/1990 |
| JP | 04-250950 A | 9/1992 |
| JP | 09-201745 A | 8/1997 |
| JP | 2000-052178 A | 2/2000 |
| JP | 2001-350510 A | 12/2001 |
| JP | 2004-295348 A | 10/2004 |
| JP | 2006-068901 A | 3/2006 |
| JP | 2010-079845 A | 4/2010 |
| JP | 2013-069192 A | 4/2013 |
| JP | 2017-224045 A | 12/2017 |
| WO | WO 2018/154605 | 8/2018 |

OTHER PUBLICATIONS

English translation of Oh Korean Patent Publication No. 20160054080 (2016).*

English translation of Kwak Korean Patent Publication No. 20130115615 (2013).*

Extended European Search Report and Examination Report for European Patent Application No. 19208026.5, dated Jul. 3, 2020, 15 pages, European Patent Office, Munich, Germany.

* cited by examiner

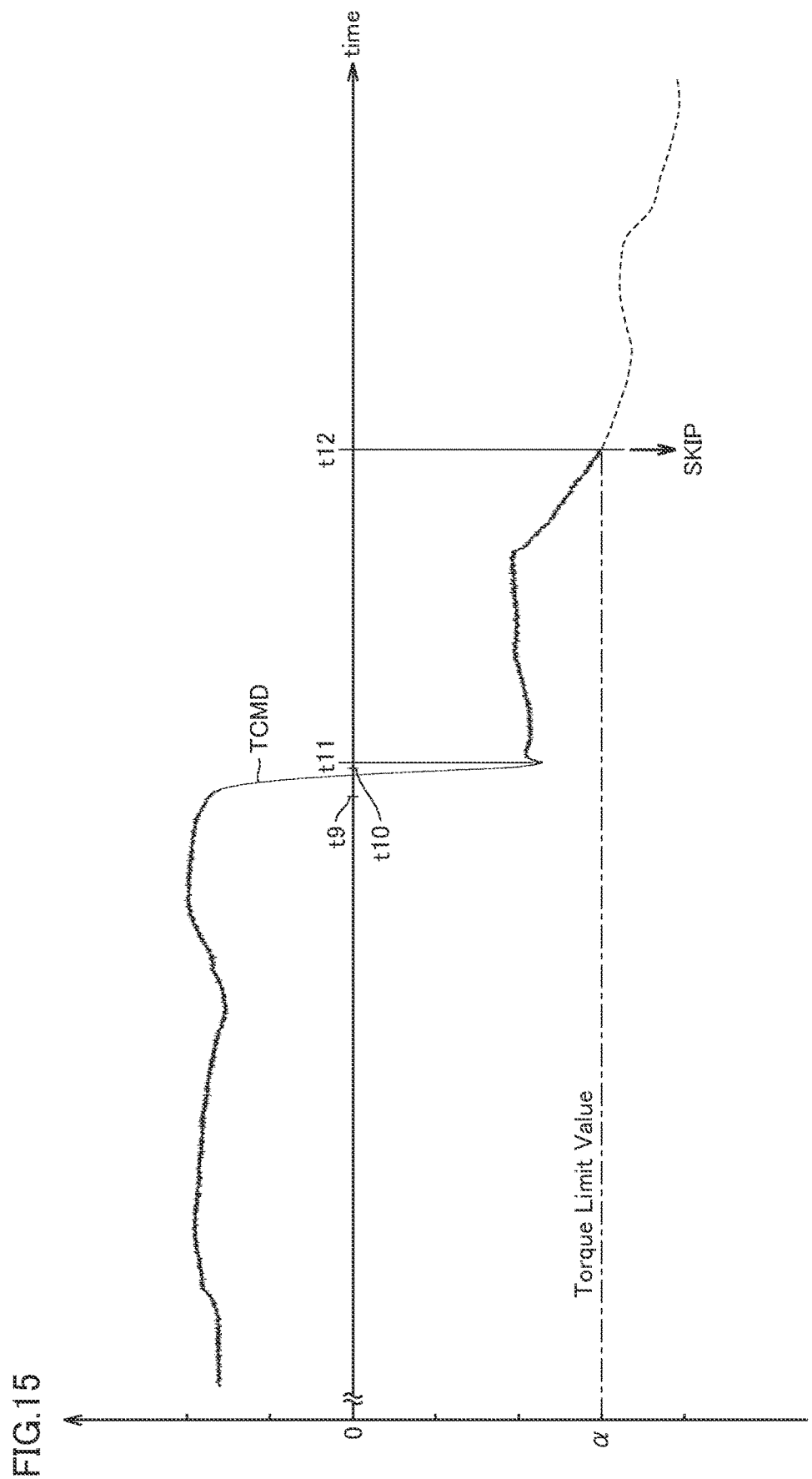

NUMERICAL CONTROL MACHINE TOOL BACKLASH DIAGNOSIS AND MAINTENANCE SYSTEM

BACKGROUND OF THE INVENTION

(1) Field of the Invention

The present invention relates to a system that is connected to an NC (numerical control) machine tool which is a numerical control device and can diagnose whether or not the NC machine tool is operating properly.

(2) Description of Related Art

In an NC machine tool (also referred to as a numerical control device, NC device, or NC) that performs workpiece cutting by numerical control, as described in Patent Literatures 1 to 3, a technique for calculating a backlash amount of a gear provided inside the machine tool, and a technique for correcting a parameter related to backlash to avoid machining defects when the backlash amount exceeds an allowable range are already known.

CITATION LIST

Patent Literatures

Patent Literature 1: Japanese Unexamined Patent Publication No. 9-201745
Patent Literature 2: Japanese Unexamined Patent Publication No. 2000-52178
Patent Literature 3: Japanese Unexamined Patent Publication No. 2010-79845

Recently, demands for labor saving and automation in factories are increasing. In the conventional technology, an operator must be disposed to each NC machine tool to operate the control panel of the NC machine tool. For this reason, in a large factory that operates many NC machine tools at the same time, improvement is desired in terms of promoting labor saving.

SUMMARY OF THE INVENTION

In view of the above circumstances, the present invention has an object to provide a labor-saved diagnosis and maintenance technology that can monitor and manage a plurality of NC machine tools without an operator disposed to each NC machine tool in diagnosing whether or not the NC machine tool is appropriate.

For this purpose, an NC machine tool diagnosis and maintenance system according to the present invention is a system including: one or more NC machine tools, one host computer device, and a communication unit that transmits and receives data between the NC machine tool and the host computer device, in which the NC machine tool includes a servomotor as power of the NC machine tool and a numerical controller that numerically controls the servomotor, the numerical controller has a monitoring unit that monitors numerical control information input/output between the numerical controller and the servomotor, and an upload unit that uploads the numerical control information monitored by the monitoring unit via the communication unit to the host computer device, and the host computer device includes a diagnosis and maintenance unit that diagnoses the NC machine tool on a basis of the numerical control information uploaded, downloads a numerical control parameter to the NC machine tool when a result of the diagnosis is outside an allowable range and within a usable range, and rewrites a numerical control parameter stored in the NC machine tool.

According to the present invention, an operator can diagnose a plurality of NC machine tools with one host computer device and can maintain the NC machine tools according to the diagnosis results, and thus there is no need to dispose an operator to each NC machine tool. The host computer device may be installed in the vicinity of a plurality of NC machine tools. Alternatively, the host computer device may be installed separately from a plurality of NC machine tools, or may be installed away from the factory where the NC machine tools are installed, thereby realizing a remote diagnosis system. The NC machine tools may be installed distributedly in a plurality of factories, and the host computer device may be connected to the plurality of factories, thereby realizing a comprehensive diagnosis system. The communication unit is not particularly limited, and for example, it may be a network unit for connecting one host computer device and a plurality of NC machine tools, a wired cable connecting one host computer device and one NC machine tool, or a short-range wireless communication unit such as Wi-Fi (Wireless Fidelity) (registered trademark). Since the present invention appropriately rewrites numerical control parameters of the NC machine tool, the NC machine tool is adjusted by the numerical control parameters and is properly operated over a long period of time.

As a preferred aspect of the present invention, when the result of diagnosis by the diagnosis and maintenance unit is within the allowable range and within the usable range, the numerical control parameter is not rewritten, and when the result of diagnosis by the diagnosis and maintenance unit is outside the allowable range and outside the usable range, a warning is output. The warning output may be output and displayed on a screen of a host computer device, for example. Alternatively, for example, it may be output and displayed on the screen of an NC machine tool via a network unit.

Numerical control information such as a program command and feedback monitored by the monitoring unit of the numerical controller is not particularly limited. As one aspect of the present invention, the numerical control information monitored by the monitoring unit is selected from among servo data including a speed command output from the numerical controller to the servomotor, a torque command output from the numerical controller to the servomotor, a speed feedback output from a feedback device provided in the servomotor to the numerical controller, a position feedback output from the feedback device to the numerical controller, and a difference (error) between the speed command and the speed feedback. The feedback device is not particularly limited, and may be a position sensor, a speed sensor, or the like. The feedback device is, for example, an encoder that is attached to the servomotor and detects the rotation angle of the servomotor.

The diagnosis and maintenance unit can diagnose whether or not servo-controlled movable parts, for example, various movable parts such as movement in the X-axis direction, movement in the Y-axis direction, movement in the Z-axis direction, rotation A around the X axis, and rotation B around the Y axis, operate properly. Further, the diagnosis and maintenance unit can maintain the NC machine tool based on the diagnosis result. As a result, the NC machine tool is continuously used in an appropriate state. As one aspect of the present invention, the diagnosis and maintenance unit calculates a backlash amount at a meshing location of a drive gear driven by the servomotor and a driven gear meshing with the drive gear, diagnoses whether or not the backlash amount is within the allowable range and whether or not the backlash amount is within the usable range, and rewrites the numerical control parameter on a basis of the backlash amount when the calculated backlash amount is outside the allowable range and within the usable range. According to this aspect, for example, when the calculated backlash amount increases, the NC machine tool can be properly operated using the rewritten new numerical control parameter. Alternatively, a warning is output when the backlash amount increases particularly.

As one aspect of the present invention, the monitor management program first drives the servomotor in the forward direction and then drives the servomotor in the reverse direction, and the diagnosis and maintenance unit calculates the backlash amount of the reverse rotation. The backlash of the reverse rotation of the mechanical system is calculated from the time until the mechanical system starts moving in the reverse direction and the feed command in the reverse direction. In order to calculate the backlash amount with high accuracy, the speed command in the forward direction and the speed command in the reverse direction described above are preferably in a low speed region rather than a high speed region during workpiece machining. A predetermined amount sufficiently larger than the backlash amount is sufficient for the forward feed command angle and the reverse feed command angle to the servomotor. A speed command (dwell) for stopping at a speed of zero may be interposed between the speed command in the forward direction and the speed command in the reverse direction.

For calculating the backlash amount, a torque command for moving the drive gear is used. After the backlash amount of the mechanical system is reduced, the torque for moving the drive gear and the driven gear changes greatly, and thus the torque command increases. As one aspect of the present invention, the diagnosis and maintenance unit analyzes the torque command output from the numerical controller, determines that the driven gear of the mechanical system has started to move due to a change in the torque command, and calculates the backlash amount.

Due to the fact that the driven gear is larger than the drive gear, the driven gear may be used ununiformly as a whole, and the use area may be unevenly distributed. As one aspect of the present invention, the monitor management program drives the servomotor in the forward direction and the reverse direction as described above at a plurality of locations of the driven gear, and the diagnosis and maintenance unit calculates respective backlash amounts at these locations and diagnoses and maintains the NC machine tool based on these multiple backlash amounts to correct the pitch error of the driven gear. According to this aspect, even when the meshing of the driven gear is unevenly distributed in a specific region due to uneven use, it is possible to diagnose the uneven wear in such a region, which contributes to proper operation of the NC machine tool. Examples of a combination of a drive gear and a driven gear include a combination of a small diameter worm screw and a large diameter worm wheel. When the worm screw drives the worm wheel, the worm wheel rotation angle for each worm screw rotation is called pitch. According to the present invention, since the pitch error is corrected at each pitch of the worm wheel and the pitch error of the worm wheel is corrected, the indexing accuracy related to the worm wheel is ensured for a long period of time.

There are various methods for calculating the backlash amount. It can be calculated based on a change in servo data such as a torque command in servo control. Servo data is output at intervals of, for example, 1 millisecond or less, and has a large fluctuation, and therefore, it may be difficult to determine whether the servo data has changed. Accordingly, as one aspect of the present invention, the diagnosis and maintenance unit levels the torque command monitored and determines a time point at which the leveled torque command continuously increases or decreases a plurality of times and calculates a backlash amount by multiplying a time from a start time point to start driving the servomotor in the reverse direction to a time point at which the mechanical system starts moving determined by a logic of the leveling (=a time point at which the torque command changes greatly) by a constant speed commanded by a program.

Alternatively, as another aspect of the present invention, the monitor management program executes a dwell that sets the speed command to zero after the servomotor is driven in the forward direction and before being driven in the reverse direction. The diagnosis and maintenance unit stores a predetermined value as a torque limit value in advance, detects a time point at which the torque command monitored exceeds the torque limit value after dwell (torque limit skip function), and calculates the backlash amount based on this time point. According to the aspects, the time required for the change in the torque command can be calculated by a simpler method than the leveling described above.

Alternatively, as yet another aspect of the present invention, the monitoring unit monitors an initial torque command which is a torque command in the initial use stage of the NC machine tool, the upload unit uploads the initial torque command to the host computer device, and the diagnosis and maintenance unit calculates an increment in the backlash amount by relatively comparing the stored initial torque command with the torque command after several months (i.e. at least three months) of use of the NC machine tool. According to this aspect, the diagnosis regarding the backlash amount can be accurately executed. In addition, "after several months of use" mentioned here may be after one year or after several years.

The drive gear and the driven gear of the NC machine tool may be rotating bodies, or may be a combination of a linear moving body and a rotating body such as a rack and pinion. Alternatively, it may be a combination of a ball and a groove like a ball screw. As one aspect of the present invention, the drive gear and the driven gear are a worm screw and a worm wheel, respectively, the worm wheel is provided coaxially with the rotary table, and the worm screw transmits the driving force of the servomotor to the rotary table. Thereby, it is possible to diagnose and maintain the backlash of the rotary table.

As described above, according to the present invention, it is possible to monitor a plurality of NC machine tools with one host computer device and to know whether or not each NC machine tool is appropriate. This will save labor for diagnosis and maintenance at large factories with multiple NC machine tools and labor for diagnosis and maintenance at multiple factories.

BRIEF DESCRIPTION OF THE DRAWINGS

FIG. 5A shows a state where backlash of forward rotation is reduced, FIG. 5B shows an enlarged view of FIG. 5A, and FIG. 5C shows a state where backlash of reverse rotation is reduced;

FIG. 15 is a graph showing a torque limit value of a variation.

DETAILED DESCRIPTION OF PREFERRED EMBODIMENT

Figure 1:
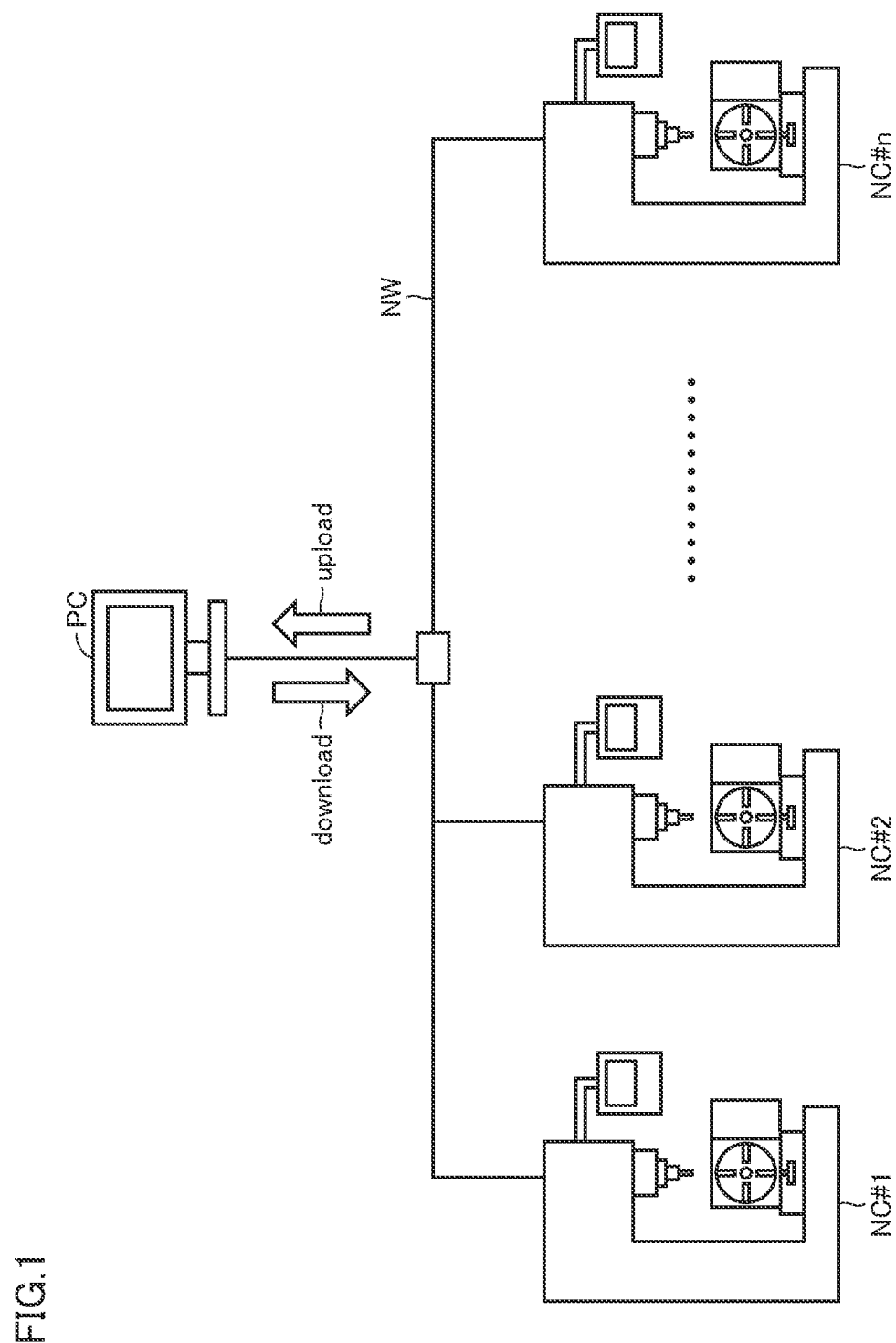
FIG. 1 is a system configuration diagram showing an embodiment of the present invention.

Hereinafter, embodiments of the present invention will be described in detail with reference to the drawings. FIG. 1 is a system configuration diagram showing an embodiment of the present invention. The present embodiment includes a plurality of NC machine tools NC #1, NC #2, . . . , and NC #n, a host computer device PC, and a network unit NW for connecting them. When there is no particular distinction between the plurality of NC machine tools NC #1 to NC #n, they are also simply referred to as NC machine tools NC. As a variation (not shown), there may be only one NC machine tool NC.

Each NC machine tool NC is a numerical control device (NC device) and operates by execution of a numerical control program. The numerical control program includes a workpiece machining program and a monitor management program. For example, the NC machine tool NC stores a workpiece machining program and numerical control parameters and machines the workpiece into a desired shape by execution of the workpiece machining program. During such machining, each NC machine tool NC operates properly based on the stored numerical control parameters. If each NC machine tool NC does not operate properly, such as delay of machining operation or deterioration in machining accuracy, the numerical control parameters are rewritten. As a result, each NC machine tool NC always works properly to machine a workpiece. Each NC machine tool NC monitors the numerical control information related to its own numerical control, and uploads the monitoring result to the host computer device PC via the network unit NW.

In the present embodiment, a group of n NC machine tools NC #1 to NC #n and one host computer device PC are connected by the network unit NW. The network unit NW is a wired cable or a wireless facility, and uploads data and downloads programs as indicated by two arrows between the host computer device PC and each lower NC machine tool NC. Each NC machine tool NC can be disposed separately from the host computer device PC. The plurality of NC machine tools NC may be disposed in the same factory, or in separate factories.

The data transmitted by the network unit NW is a numerical control program or numerical control information. As indicated by the downward arrow in FIG. 1, the host computer device PC of the present embodiment downloads to each lower NC machine tool NC a workpiece machining program, a monitor management program, and numerical control parameters via the network unit NW, or rewrites such programs and parameters. Further, if necessary, the host computer device PC outputs an OFF/ON command to each lower NC machine tool NC via the network unit NW as indicated by the downward arrow in FIG. 1 to turn OFF/ON the power of the lower NC machine tool NC. Thereby, each NC machine tool NC is restarted. Alternatively, each NC machine tool NC starts or ends a workpiece machining program or a monitor management program renewed by rewriting. The same applies to the rewritten new numerical control parameter.

Each NC machine tool NC uploads information related to the NC machine tool NC to a host computer device as indicated by an upward arrow in FIG. 1. The upload will be described in detail later.

Figure 2:
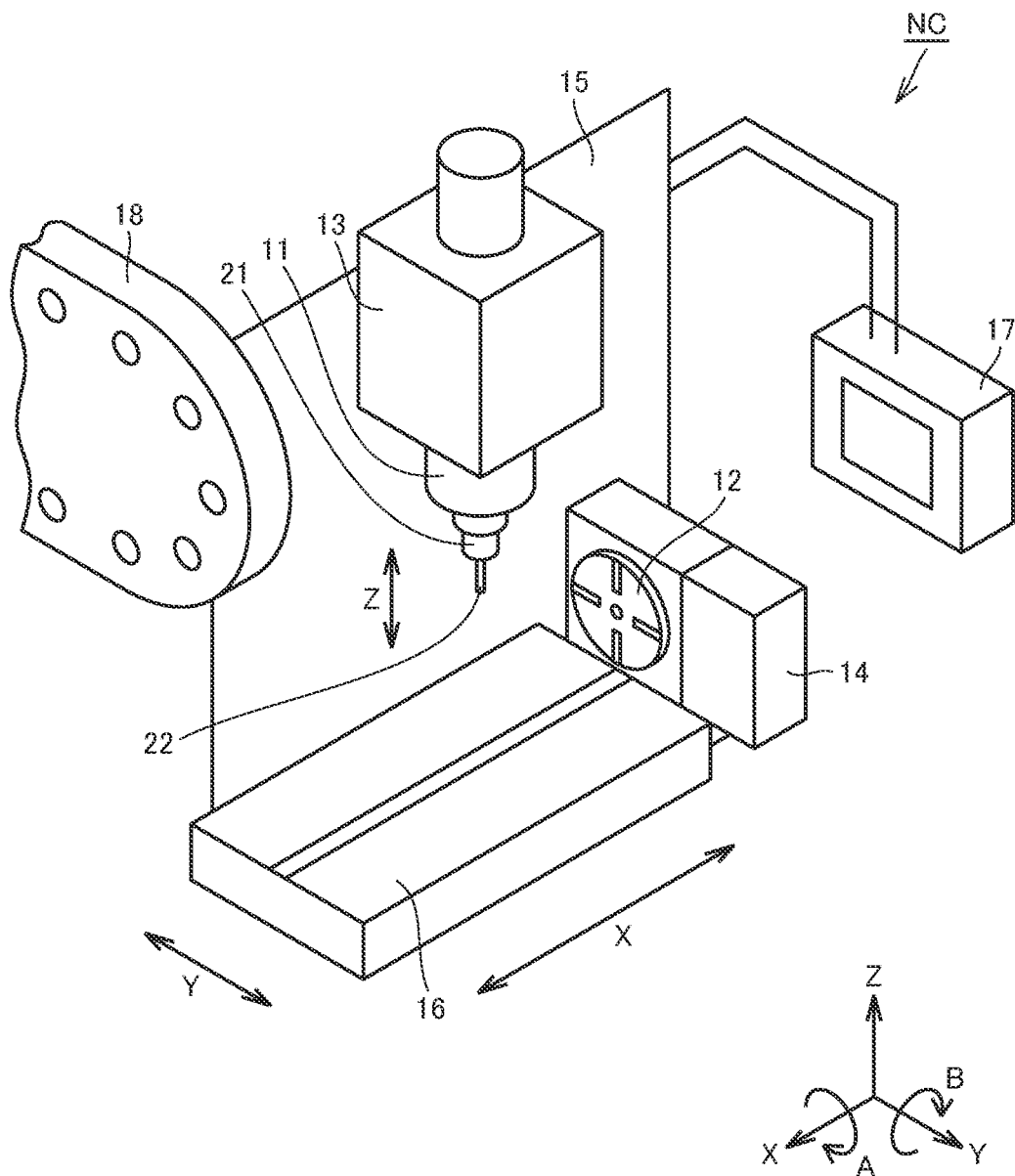
FIG. 2 is a perspective view showing an NC machine tool of the same embodiment.

FIG. 2 is a perspective view schematically showing one NC machine tool NC taken out. The NC machine tool NC includes a spindle 11, a rotary table 12, a spindle drive unit 13, a rotary table drive unit 14, a spindle support unit 15, a rotary table support unit 16, a numerical controller 17, and a tool magazine 18.

The spindle drive unit 13 supports the spindle 11 and rotates the spindle 11. The spindle support unit 15 supports the spindle drive unit 13 and moves the spindle drive unit 13 in the vertical direction (Z-axis). The Z-axis movement indicated by an arrow in FIG. 2 is performed by a servomotor (not shown) provided on the spindle support unit 15. A tool holder 21 and a tool 22 are attached to the tip of the spindle 11. That is, the spindle 11 can move in the Z-axis direction and can further rotate about the Z-axis.

The rotary table 12 is, for example, a circular table, and a workpiece (not shown) is fixed. The rotary table drive unit 14 incorporates a servomotor (not shown) and indexes the rotary table 12. The rotary table support unit 16 supports the rotary table 12 and the rotary table drive unit 14. The rotary table 12 rotates in the A direction indicated by an arrow in FIG. 2.

The NC machine tool NC further includes a servomotor (not shown), moves the spindle 11 in the Z-axis direction indicated by arrows in FIG. 2, moves the rotary table 12 in the X-axis direction and the Y-axis direction, and rotates the rotary table 12 in the A direction. The NC machine tool NC according to the present embodiment performs at least one of a movement in a direction along the X axis, the Y axis, and the Z axis, and a rotation A and a rotation B about the X axis and the Y axis. A servomotor is provided for each movement in each axial direction. That is, this embodiment has four servomotors.

The tool magazine 18 supplies the tool holder 21 and the tool 22 to the spindle 11, or receives the tool holder 21 and the tool 22 from the spindle 11, thereby assisting the removal, attachment, and replacement of the tool holder 21 attached to the spindle 11.

Figure 3:
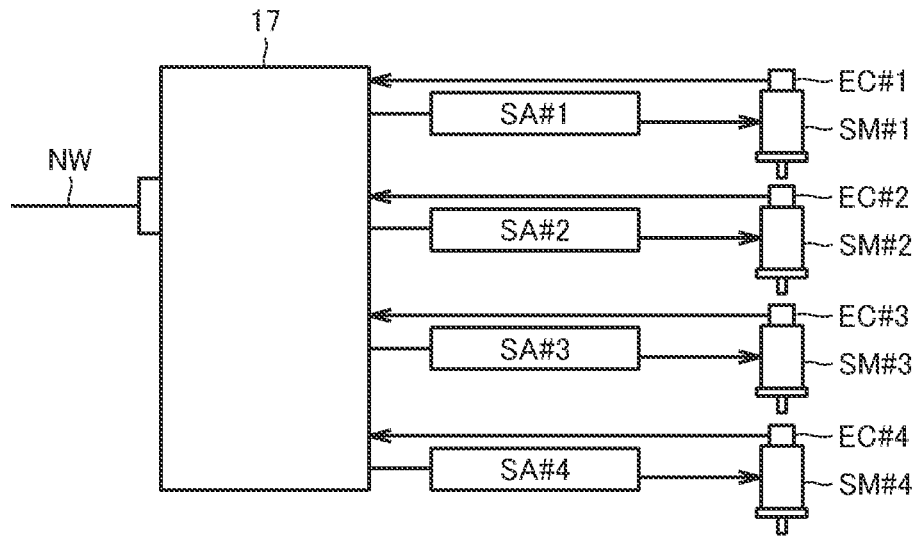
FIG. 3 is a schematic diagram showing a configuration of the NC machine tool of the same embodiment.

FIG. 3 is a schematic diagram showing the configuration of the NC machine tool NC. In FIG. 3, only the structure related to the present invention is shown, and other structures such as high-voltage wiring are omitted. The numerical controller 17 is connected to a plurality of servo amplifiers SA #1 to SA #4. One servo amplifier SA is connected to one servomotor SM and outputs various commands to the servomotor SM. Each servomotor SM is provided with an encoder EC. One encoder EC or multiple encoders EC #1 EC #4 are connected to the numerical controller 17 to detect the rotational speed or the like of each servomotor SM and output it to the numerical controller 17. The numerical controller 17 that receives the speed feedback of the servomotor SM from the encoder EC performs feedback control of each servomotor SM (SM #1, . . . SM #4). The numerical controller 17 is connected to the network unit NW.

Figure 4:
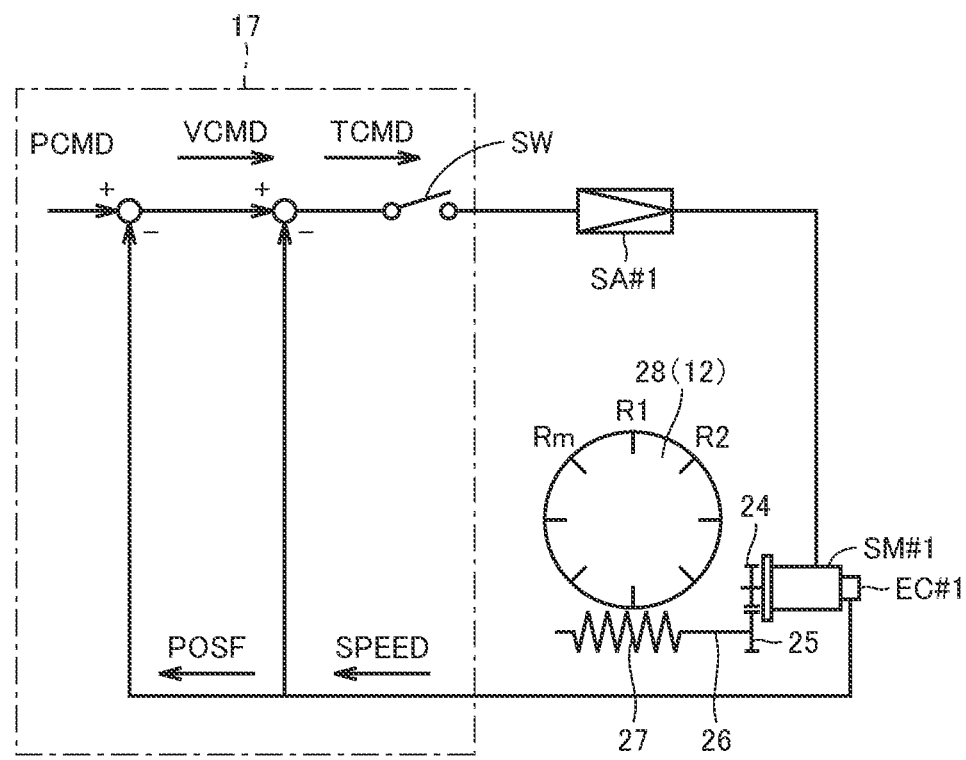
FIG. 4 is a schematic diagram showing servo control executed in the NC machine tool.

FIG. 4 is a schematic diagram showing the control executed inside the NC machine tool NC together with the configuration. As an internal configuration of the NC machine tool NC, a pinion 24 is coupled to the motor rotation shaft of the servomotor SM #1. The pinion 24 meshes with the pinion 25. The pinion 25 is coupled to a worm shaft 26 and a worm screw 27. The worm screw 27 meshes with the worm wheel 28. The worm wheel 28 has a diameter much larger than that of the worm screw 27 and is coaxially coupled to the rotary table 12 described above.

The encoder EC #1 outputs a speed feedback SPEED or a position feedback POSF of the servomotor SM #1 to the numerical controller 17. A speed command VCMD is obtained from the difference between a position command PCMD and the position feedback POSF of the rotary table 12. The numerical controller 17 obtains a torque command TCMD from the difference between the speed command VCMD and the speed feedback SPEED, and outputs the torque command TCMD to the servo amplifier SA #1 via a switch SW. The servo amplifier SA #1 amplifies the input torque command TCMD and outputs it to the servomotor SM #1.

The servomotor SM #1 drives the pinion 24 according to the input torque command TCMD, and the driving rotation is transmitted from the pinion 24 to the worm wheel 28 via the pinion 25, the worm shaft 26, and the worm screw 27. The rotational position of the rotary table 12 is determined according to the numerical control program.

Servo data such as the position command PCMD, speed command VCMD, torque command TCMD, speed feedback SPEED, and position feedback POSF shown in FIG. 4 is monitored by a monitoring unit of the numerical controller 17. Monitoring is continuous monitoring.

Here, in addition, in order to improve diagnostic accuracy, the position command PCMD to the servomotor SM accompanying execution of the monitor management program is in the low speed region. On the other hand, in order to improve work efficiency, the position command PCMD to the servomotor SM accompanying execution of the workpiece machining program is from the low speed region to the high speed region.

The numerical controller 17 of the present embodiment uses the backlash at the meshing location of the worm wheel 28 and the worm screw 27 as a diagnosis target.

Figure 5A:
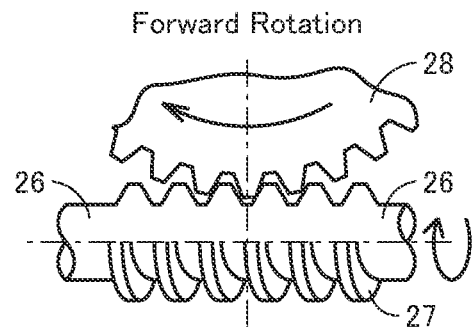
FIGS. 5A to 5C are front views each showing a meshing location of a gear, where
Figure 5B:
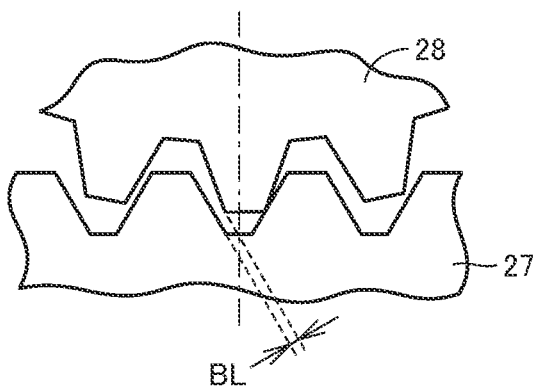
Figure 5C:
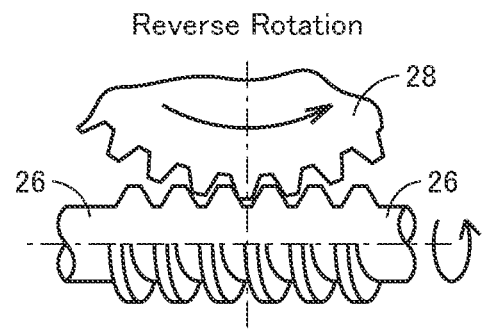

FIGS. 5A to 5C are front views each showing the meshing location of the gear, and FIG. 5A shows a state in which the backlash of the reverse rotation is increased by reducing the backlash in the normal rotation direction by normally rotating the worm screw clockwise, FIG. 5B shows an enlarged view of FIG. 5A, and FIG. 5C shows a state in which the backlash of the reverse rotation is reduced by rotating the worm screw 27 counterclockwise. In this embodiment, according to the monitor management program, the servomotor SM is driven in the forward direction and the operation shown in FIG. 5A is executed, and then the speed command to the servomotor SM is set to zero (dwell) to set the rotational speed of the worm screw 27 to zero, and then a series of numerical control is performed by driving the servomotor SM in the reverse direction to perform the operation of FIG. 5C. From the numerical control information related to the numerical control, the backlash amount BL (FIG. 5B) of the worm wheel 28 and the worm screw 27 in the reverse direction is calculated.

Figure 6:
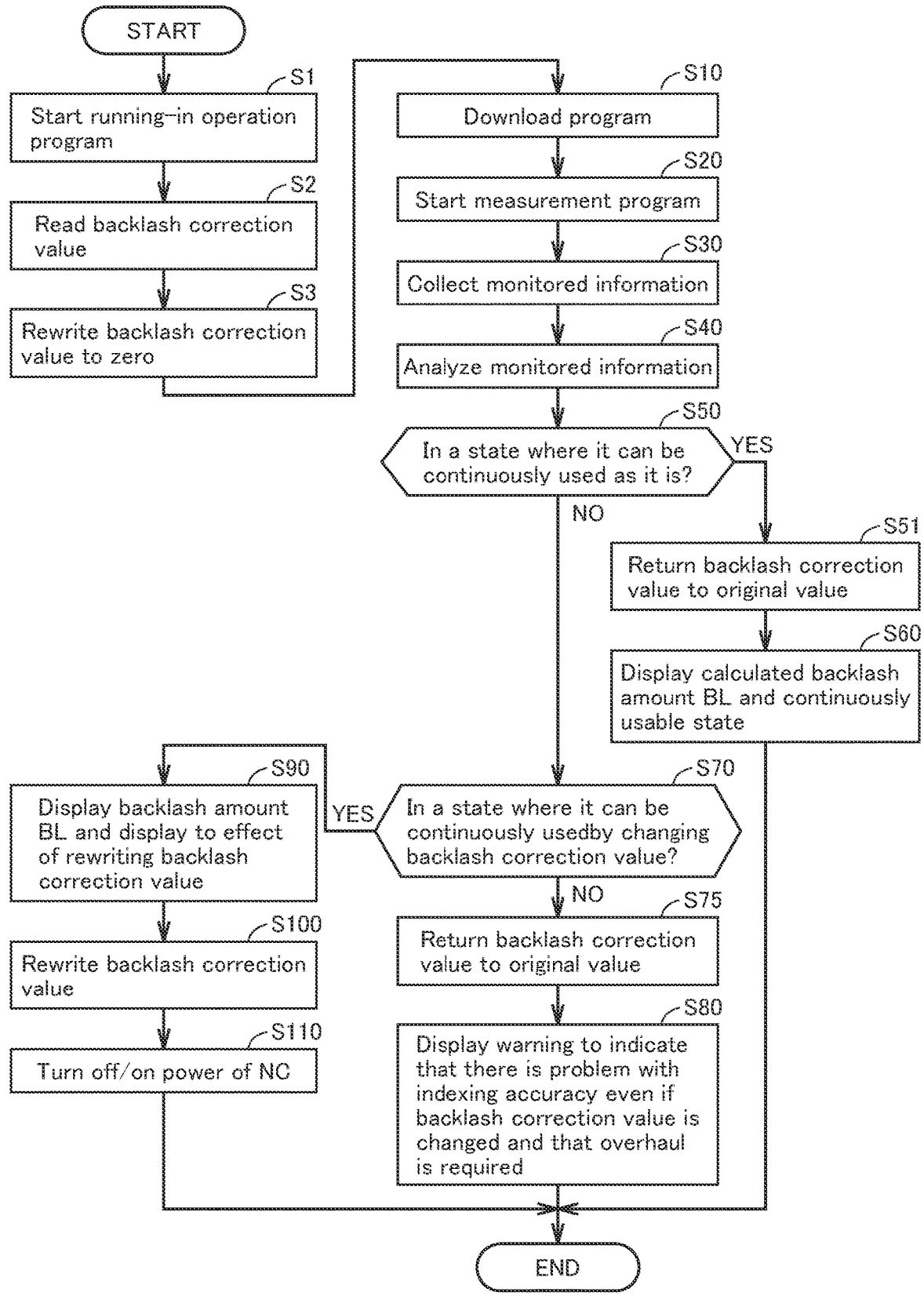
FIG. 6 is a flowchart showing numerical control executed in the embodiment.

The numerical controller 17 has a program execution unit for storing and executing a numerical control program, a monitoring unit for monitoring the numerical control information, an upload unit for uploading the monitored numerical control information to the host computer device PC, and a parameter storage unit for storing numerical control parameters. The host computer device PC has a diagnosis and maintenance unit for diagnosing the NC machine tool NC and a parameter rewriting unit for rewriting numerical control parameters. The host computer device PC executes the control of FIG. 6 based on the numerical control information uploaded from the numerical controller 17. FIG. 6 is a flowchart showing the control executed in this embodiment. In the following description, a numerical control parameter related to the control system related to the adjustment of the backlash amount BL related to the mechanical system is referred to as a backlash correction value.

First, in step S1, the host computer device PC starts a running-in operation program and causes the NC machine tool NC to perform running-in operation. The running-in operation is, for example, a warming-up operation, causing the servomotors SM #1, SM #2, . . . to perform idling rotation to operate the NC machine tool NC. Thereby, the NC machine tool NC is continuously maintained within a constant temperature range. Alternatively, in the NC machine tool NC, the lubrication state of the mechanical system is kept constant. When the running-in operation is completed, the process proceeds to the next step S2.

In step S2, the host computer device PC reads the backlash correction value at the previous operation of the NC machine tool NC preliminarily stored in the parameter storage unit and stores it in a cache memory.

In the next step S3, the host computer device PC once rewrites the backlash correction value of the NC machine tool NC to zero. If the backlash correction value includes a value other than zero, that value is first commanded after step S10 described later, and the backlash amount BL is calculated from that value. Step S3 prevents this. In the following step S10 and subsequent steps, the backlash amount BL is calculated with the backlash correction value=0.

In the next step S10, the monitor management program is downloaded from the host computer device PC to the NC machine tool NC via the network unit NW. The monitor management program is stored in the program execution unit of the numerical controller 17. In the next step S20, the monitor management program of the NC machine tool NC is started.

In the next step S30, the NC machine tool NC executes the monitor management program, drives the servomotor SM to rotate the worm screw, and reduces the backlash amount BL of the reverse rotation as next shown in FIG. 5C with respect to the backlash amount BL shown in FIGS. 5A and 5B. In such a series of operations, the numerical controller 17 outputs the torque command TCMD to the servomotor SM at intervals of, for example, 1 millisecond or less, and the encoder EC attached to the servomotor SM detects the speed feedback SPEED of the servomotor SM at intervals of 1 millisecond or less and outputs it to the numerical controller 17, and the speed feedback SPEED is input to the numerical controller 17. In the input/output of these commands (numerical control information), the monitoring unit of the numerical controller 17 monitors these numerical control information (servo data), and the upload unit of the numerical controller 17 uploads the monitored numerical control information to the host computer device PC via the network unit NW. The host computer device PC collects the uploaded numerical control information (servo data).

In the next step S40, the diagnosis and maintenance unit of the host computer device PC analyzes the numerical control information collected in step S30 and calculates the backlash amount BL. Although the calculation of the backlash amount BL may be a result of executing the operation of FIG. 5 only once, in order to improve the accuracy of diagnosis, it is preferable to calculate a backlash amount at a predetermined circumferential location Rx (for example, R1 among R1 to R8 in FIG. 4) of the worm wheel 28 corresponding to a predetermined index angle of the rotary table 12 a plurality of times, and determine the backlash amount BL based on the calculation results of the plurality of times. The term "based on the calculation results of the plurality of times" means, for example, based on an average value of a plurality of calculated backlash amounts, an average value of the remaining values excluding the maximum value and the minimum value among the plurality of backlash amounts, the median value of a plurality of calculated backlash amounts, or the mode value of the calculated plurality of backlash amounts.

In the next step S50, the diagnosis and maintenance unit of the host computer device PC checks whether or not the backlash amount BL calculated in step S40 is within a predetermined allowable range. If the backlash amount BL is within the allowable range, it is determined that the NC machine tool NC is in an appropriate state and can be continuously used as it is (YES), and the process proceeds to step S51.

In the next step S51, the backlash correction value is returned to the original value, and the process proceeds to step S60. The original value is the value stored in the cache memory in step S2 described above.

In step S60, the backlash amount BL calculated in step S40 and the fact that the NC machine tool NC can be continuously used as it is are displayed, and this control is ended (END). Such display may be performed on the display unit of the host computer device PC (the display is performed in the same manner hereinafter). The host computer device PC transmits the diagnosis result of step S60 to an external communication terminal by e-mail and/or the Internet. The administrator of the NC machine tool NC can know the status of the NC machine tool NC, even if the administrator is away from the NC machine tool NC and furthermore away from the host computer device PC.

On the other hand, if the backlash amount BL is outside the allowable range in step S50 described above, it is determined that the mechanical system of the NC machine tool NC is not in an appropriate state and cannot be continuously used as it is (NO), and the process proceeds to step S70.

In the next step S70, the diagnosis and maintenance unit of the numerical controller 17 determines whether or not it is possible to return the NC machine tool NC to an appropriate state by correcting the backlash correction value, which is a numerical control parameter for correcting the backlash amount BL, in other words, whether or not the backlash amount BL is within a predetermined usable range. The usable range is a range wider than the allowable range, and includes the allowable range. If the backlash amount BL is out of the usable range (NO) due to the reason that it is too large or the like, the NC machine tool NC cannot be used, and the process proceeds to step S75. On the other hand, if it is within the usable range (YES), the NC machine tool NC can be used by adjusting the backlash correction value, and thus the process proceeds to step S90.

In step S90, the calculated backlash amount BL and a message indicating that the backlash correction value is to be changed are displayed, and the process proceeds to step S100. In the next step S100, the backlash correction value is changed. The calculation of the backlash correction value may be executed by the parameter rewriting unit of the host computer device PC based on the calculated backlash amount BL. The parameter rewriting unit of the host computer device PC rewrites the backlash correction value stored in the parameter storage unit, and the process proceeds to step S110.

If necessary, in the next step S110, the power of the NC machine tool NC is stopped in response to the command from the host computer device PC, and this control is ended (END). After the next restart, the NC machine tool NC machines the workpiece by execution of the workpiece machining program and the rewritten new backlash correction value. Also in steps S80 to S110 described above, the host computer device PC transmits the diagnosis result to an external communication terminal by e-mail and/or the Internet to inform the backlash amount BL, rewriting of the backlash correction value, and a warning. The administrator of the NC machine tool NC can know the status of the NC machine tool NC, even if the administrator is away from the NC machine tool NC and furthermore away from the host computer device PC.

On the other hand, in step S75 described above, the backlash correction value is returned to the original value, and the process proceeds to step S80. The original value is the value stored in the cache memory in step S2 described above. Even if it is determined in step S70 that the backlash amount is excessive, the NC machine tool NC can be continuously used tentatively by executing step S75.

In step S80, a warning to the effect that there is a problem with the indexing accuracy of the rotary table 12 even if the backlash correction value is changed and that the mechanical system including the worm wheel 28 needs to be overhauled is displayed, and this control is ended (END).

Figure 7:
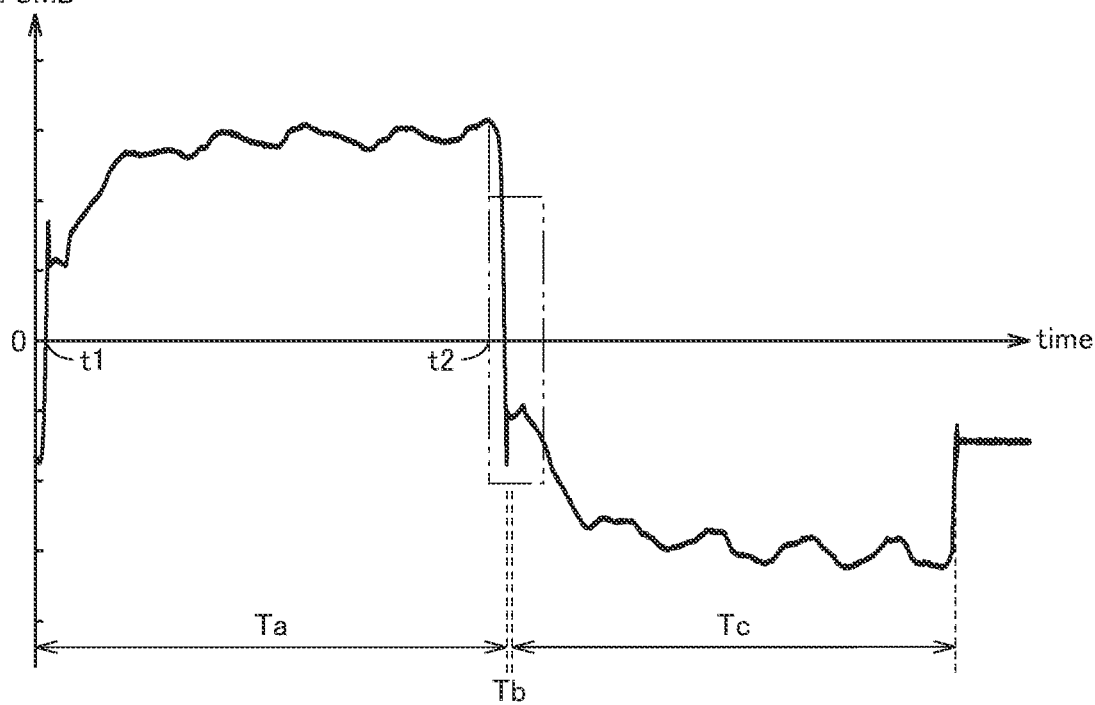
FIG. 7 is a graph showing a change in a torque command according to the embodiment.
Figure 8:
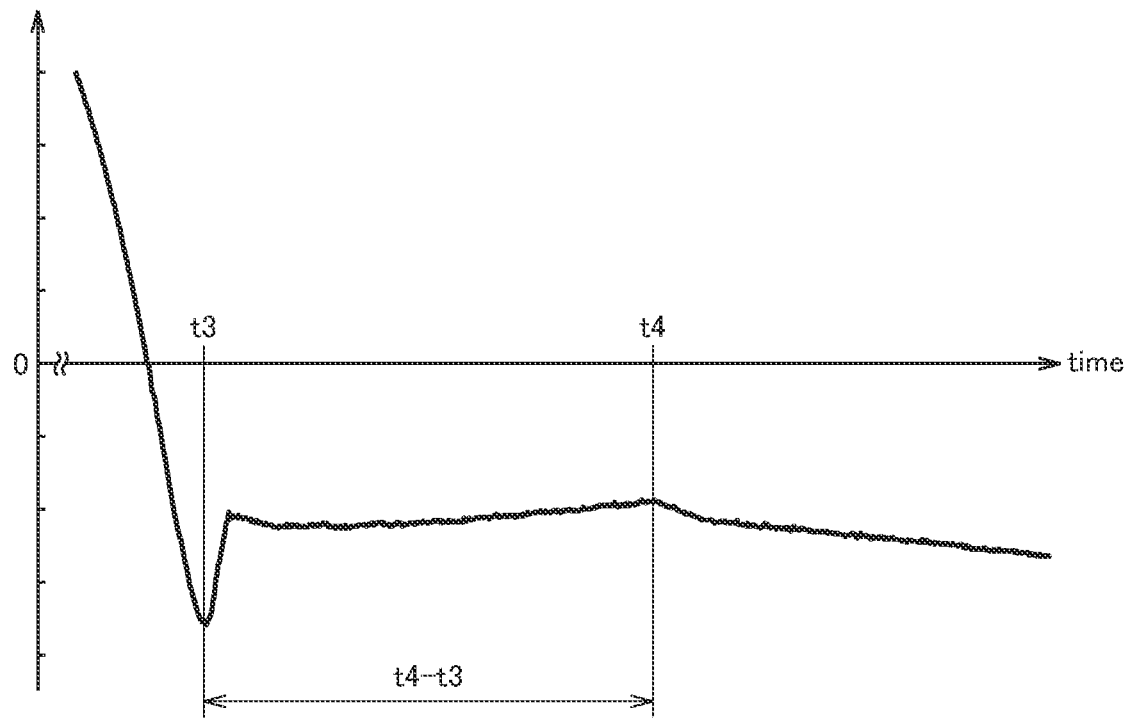
FIG. 8 is a graph showing a portion encircled by two-dot chain line in FIG. 7 in an enlarged manner.

FIG. 7 is a graph showing the collected numerical control information regarding step S30, and FIG. 8 is a graph showing the portion encircled by two-dot chain line in FIG. 7 in an enlarged manner. In FIGS. 7 and 8, the horizontal axis represents time [msec], and the vertical axis represents the torque command TCMD. The numerical controller 17 outputs a torque command TCMD to the servomotor SM every one millisecond. First, the servomotor SM is normally rotated in the period Ta and the worm screw 27 is rotated clockwise as shown in FIG. 5A. Next, a dwell period Tb is provided, and then the servomotor SM is reversely rotated in the period Tc, and the worm screw 27 is rotated counterclockwise to reduce the backlash as shown in FIG. 5C. The normal rotation of the servomotor SM is a clockwise rotation of the worm wheel 28 shown in FIG. 5A, and may be a counterclockwise rotation of the worm wheel 28 although not shown. The measurement direction of the backlash amount BL may be any direction clockwise/counterclockwise.

While the backlash of the reverse rotation shown in FIG. 5B in the enlarged manner is reduced by the reverse rotation shown in FIG. 5C, since the servomotor SM drives the worm screw 27 and does not drive the worm wheel 28, the torque command TCMD is small. After the backlash is reduced, the servomotor SM drives the worm screw 27 and the worm wheel 28, so that the torque command TCMD becomes large.

In FIG. 7, the torque command TCMD is a positive value from time t1 to time t2 included in the period Ta. At time t2, the torque command TCMD turns from increasing to decreasing and then becomes a negative value. The next time t3 is a time point at which the torque command TCMD of reverse rotation suddenly rises to the negative side.

The next time t4 is a time point at which the substantially constant torque command TCMD, which has repeatedly increased and decreased, continuously decreases greatly a plurality of times. At time t4, the backlash is completely reduced and the worm wheel 28 starts to rotate counter-clockwise (FIG. 5C).

In step S40 described above, the time t4 when the backlash is reduced is determined from the increase/decrease in the torque command TCMD graphed as shown in FIG. 8. Time in this specification is synonymous with a time point.

During the period from time t3 to time t4, the servomotor SM rotates in accordance with the reverse rotation command, but the worm wheel 28 is stopped. That is, the time for reducing the backlash is roughly (t4–t3).

The backlash amount BL of the mechanical system is calculated from the backlash reducing time (t4–t3) [msec], the feed speed [deg/msec] on the program, and the pitch circle diameter [mm n] of the worm wheel 28.

As an example, the backlash correction value is rewritten based on the absolute backlash amount BL calculated from FIG. 8 as described above.

Alternatively, in an initial use stage of NC machine tools NC such as when a new NC machine tool NC is shipped from a manufacturer, or when a user first uses an almost new NC machine tool NC, FIG. 8 is analyzed as described above to determine and store the time point (time t4) when the backlash amount BL of reverse rotation is reduced and the worm wheel 28 starts to move. After that, for example, after using the NC machine tool NC for several months to several years, the above-mentioned program is executed, and at that time, a time point (time t8 described later) when the backlash amount BL of the reverse rotation is reduced and the worm wheel 28 starts to move is similarly determined. When the NC machine tool NC is used for many years, the backlash amount BL increases due to wear or the like, so the time t8 comes later than the time t4. The incremental amount in the backlash amount BL over time is calculated from the relative comparison between the time t8 and the time t4, and the backlash correction value is rewritten based on the incremental amount in the backlash amount BL.

Figure 9:
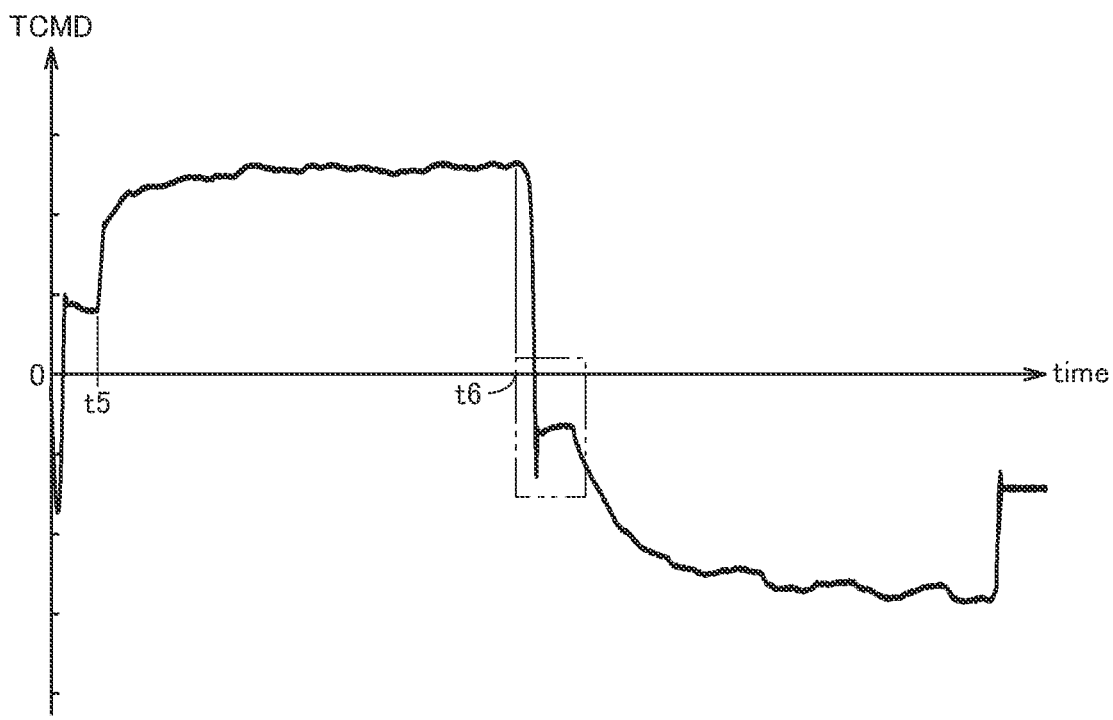
FIG. 9 is a graph showing a change in a torque command according to the embodiment.
Figure 10:
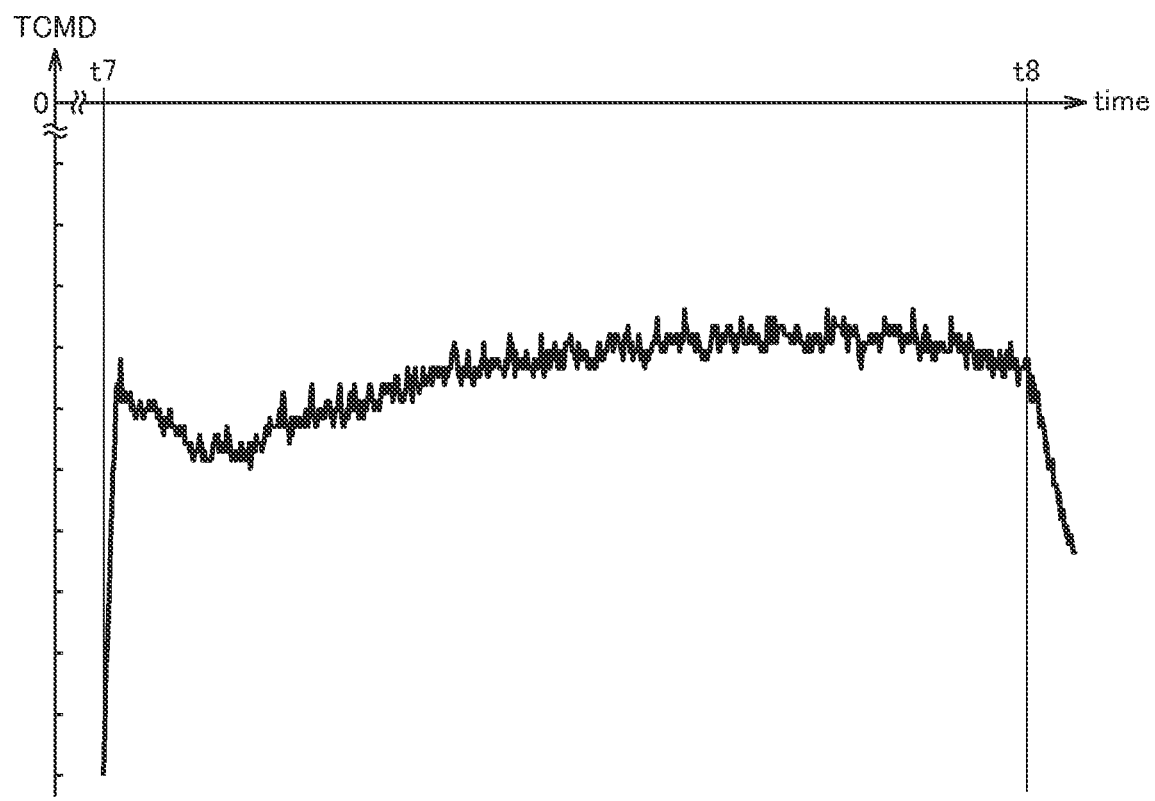
FIG. 10 is a graph showing a portion encircled by two-dot chain line in FIG. 9 in an enlarged manner.

FIGS. 9 and 10 are analysis data when calculating the backlash amount after using the NC machine tool NC for several months to several years. First, from time t5 to time t6 shown in FIG. 9, the torque command TCMD is a positive value. At time t6, the torque command TCMD turns from increasing to decreasing and then becomes a negative value. FIG. 10 is a graph showing the portion encircled by two-dot chain line in FIG. 9 in an enlarged manner.

Time t7 after time t6 is a time at which the torque command TCMD rises sharply instantaneously. Time t8 is a time at which the torque command TCMD decreases greatly continuously a plurality of times.

The backlash amount BL afterwards is calculated from the time (t8–t7) [msec] for reducing the backlash in the reverse rotation shown in FIG. 10, the feed speed [deg/msec] on the program, and the pitch circle diameter [mm·π] of the worm wheel. In order to avoid duplication with the description of FIG. 7 and FIG. 8, a detailed description of FIG. 9 and FIG. 10 is omitted.

By the way, when collecting torque command TCMD data output every 1 [msec] as shown in FIG. 10, the torque command TCMD graph becomes jagged, and it becomes difficult to determine the time when the torque command TCMD decreases continuously a plurality of times, or the time when it increases continuously a plurality of times.

Therefore, in the monitor management program of this embodiment, the torque command TCMD is leveled.

Figure 11:
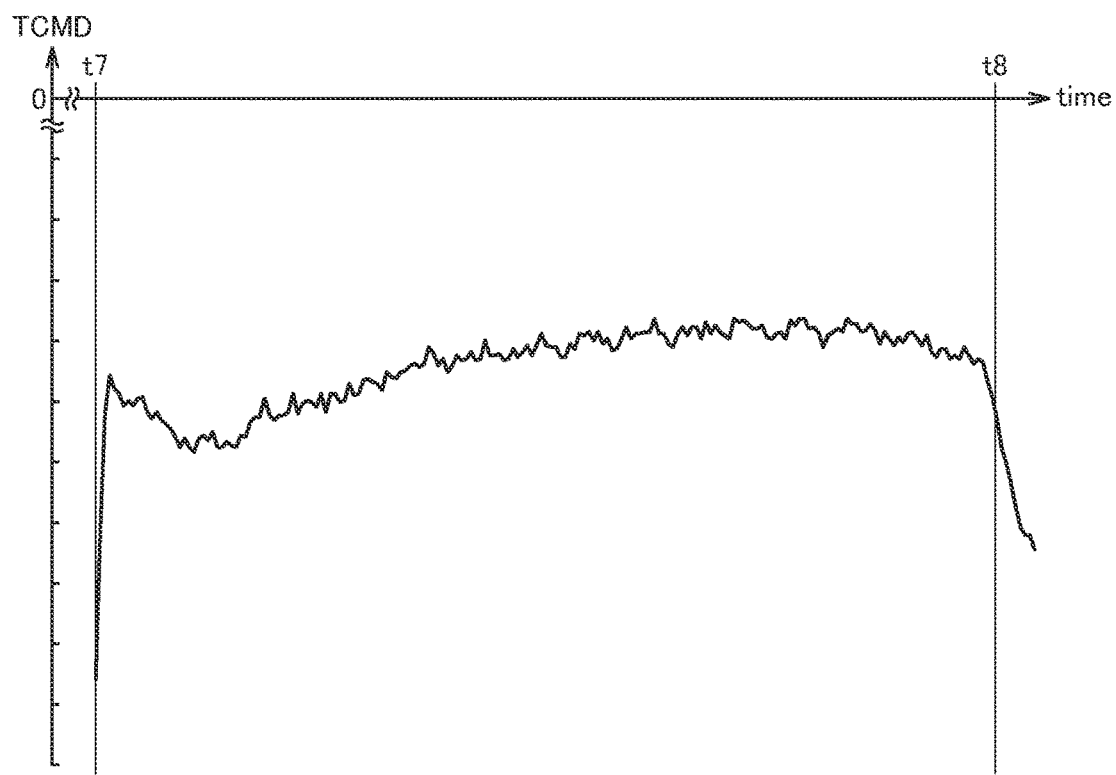
FIG. 11 is a graph showing the torque command of FIG. 10 in a leveled manner.

Specifically, for example, an average value of five consecutive points of the torque command TCMD is obtained. Then, a leveled graph (FIG. 11) is created using the five-point average value. FIG. 11 is a graph obtained by leveling FIG. 10. Since the torque command TCMD shown in FIG. 11 that has been leveled does not repeat sharp increase and decrease compared to the torque command TCMD shown in FIG. 10 that is not leveled, it becomes easier to determine the time t8 when the torque command TCMD decreases continuously a plurality of times.

Figure 12:
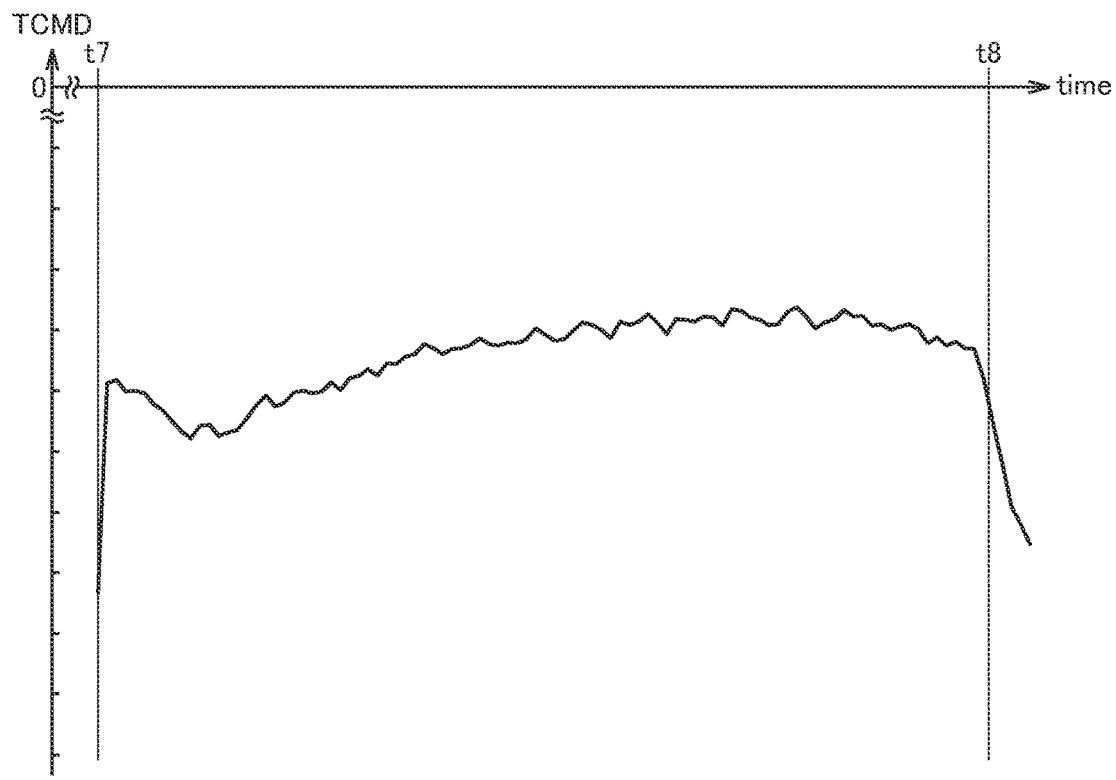
FIG. 12 is a graph showing the torque command of FIG. 10 in a leveled manner.

Alternatively, for example, an average value of 10 consecutive points of the torque command TCMD is obtained. Then, a leveled graph (FIG. 12) is created using the 10-point average value. FIG. 12 is a graph obtained by leveling FIG. 10.

The leveling shown in FIG. 12 can make it easy to determine the time t8 when the torque command TCMD decreases continuously a plurality of times.

Figure 13:
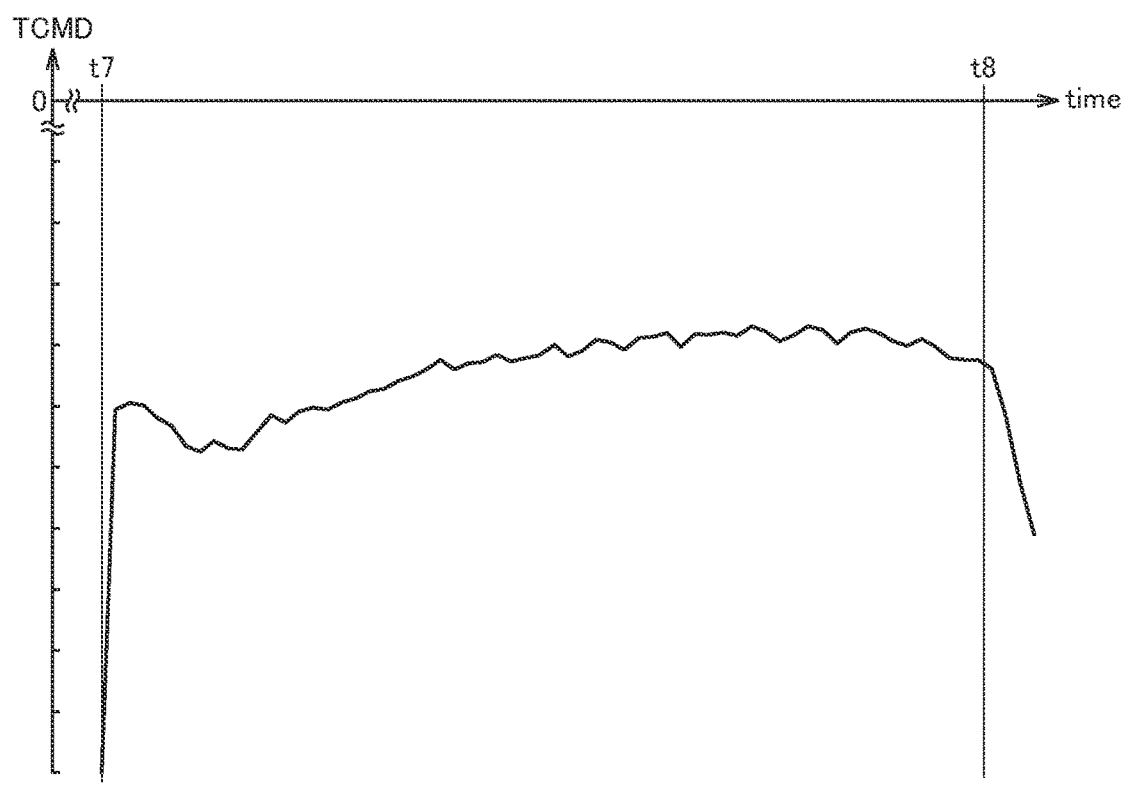
FIG. 13 is a graph showing the torque command of FIG. 10 in a leveled manner.

Alternatively, for example, an average value of 15 consecutive points of the torque command TCMD is obtained. Then, a leveled graph (FIG. 13) is created using the 15-point average value. FIG. 13 is a graph obtained by leveling FIG. 10.

The leveling shown in FIG. 13 can make it easy to determine the time t8 when the torque command TCMD decreases continuously a plurality of times.

Figure 14:
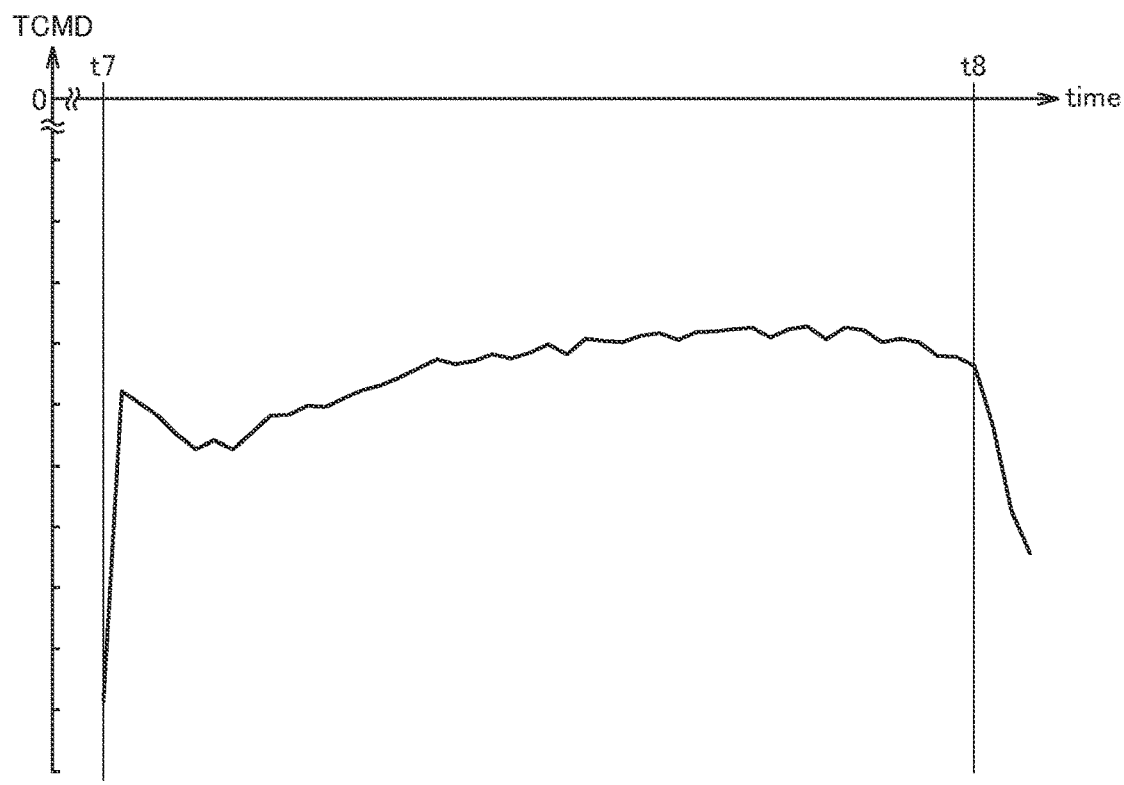
FIG. 14 is a graph showing the torque command of FIG. 10 in a leveled manner.

Alternatively, for example, an average value of 20 consecutive points of the torque command TCMD is obtained. Then, a leveled graph (FIG. 14) is created using the 20-point average value. FIG. 14 is a graph obtained by leveling FIG. 10.

The leveling shown in FIG. 14 can make it easy to determine the time t8 when the torque command TCMD decreases continuously a plurality of times.

As shown in FIGS. 11 to 14, when leveling with a plurality of consecutive points, if too much numerical control information is averaged, the graph becomes excessively flat, making it more difficult to determine the time t8. Therefore, it is preferable to perform the leveling appropriately so that the numerical control information to be averaged is not too small and not too large.

In this embodiment, it is possible not only to calculate the backlash amount at one location in the circumferential direction of the rotary table 12, but also to calculate the backlash amount at a plurality of locations separated in the circumferential direction. For example, in this embodiment, at the predetermined circumferential locations R1, R2, . . . Rm shown in FIG. 4, the backlash amounts BL1 . . . BLm can be calculated, such as the backlash amount BL1 at the circumferential location R1, the backlash amount BL2 at the circumferential location R2, and so on. For example, R1 . . . Rm are predetermined locations at 45° intervals with respect to the center of the rotary table 12 (m=8).

Since the worm wheel 28 has a much larger diameter than the worm screw 27, the worm screw 27 meshes in common with each of the circumferential positions R1 Rm of the worm wheel 28. The angular positions of the circumferential positions R1, . . . Rm of the worm wheel 28 correspond to the angular positions of the rotary table 12.

Depending on the shape of the workpiece chucked on the rotary table 12, the indexing of the rotary table 12 may be biased to a specific circumferential region, and the worm wheel 28 may be particularly worn in such a circumferential region.

According to the present embodiment, when the backlash amount BL at one location of R1 to Rm is outside the allowable range, the fact that the worm wheel 28 should be overhauled can be displayed to warn of the fact, and the NC machine tool NC can operate properly.

Note that the rewriting of the backlash correction value in step S100 described above may be based on the average value of the backlash amounts at the circumferential locations R1 to Rm.

The present embodiment further includes a pitch error correction function, and ensures the indexing accuracy of the rotary table 12 for a long period of time.

The indexing accuracy of the rotary table 12 will be described. The rotary table 12 of the mechanical system may include a pitch error exceeding an allowable value. Therefore, in the present embodiment, a pitch error correction amount corresponding to the backlash amount BL is calculated for each circumferential location R1 Rm of the worm wheel 28. The NC machine tool NC rewrites the pitch error correction value based on the calculated pitch error correction amount.

For example, when the worm wheel 28 rotates 5° (5° pitch) every time the worm screw 27 makes one rotation, the backlash amount BL is calculated for each pitch, i.e., each of circumferential locations of 0°, 5°, 10°, 15° . . . 355°, 360°(=0°) of the worm wheel 28. Then, the diagnosis/maintenance shown in FIG. 6 described above is executed for each of circumferential locations of 0°, 5°, 10°, 15° . . . 355°, 360°(=0°), that is, for each pitch. According to this embodiment, when the worm screw 27 rotates an integral multiple of rotation of the worm wheel 28 per rotation of the worm wheel 28, the indexing accuracy of any angle of the worm wheel 28 is ensured for a long period of time.

As an example, when the worm wheel 28 is unevenly worn at the circumferential location 30° described above, the backlash correction value is rewritten at the circumferential location 30° (step S100), and the previous backlash correction value is applied at other circumferential locations (step S60). According to the present embodiment, even when the worm wheel 28 is unevenly worn, the pitch error accompanied with this is corrected, and the indexing accuracy is ensured for a long period of time.

Note that, pitch error correction may be performed for all pitches (all circumferential locations) constituting the entire circumference of the worm wheel 28 as described above, or it may be executed only at any circumferential location such as only at the circumferential location used for positioning of the actual index angle.

By the way, the diagnosis and maintenance system according to the present embodiment includes one or more NC machine tools NC #1, . . . NC #n, one host computer device PC, and a network unit NW for connecting the plurality of NC machine tools NC #1, . . . and the host computer device PC, and each NC machine tool NC includes a servomotor SM as the power of the NC machine tool NC, and a numerical controller 17 for numerically controlling the servomotor SM. The numerical controller 17 has a monitoring unit that monitors servo data (numerical control information) input/output between the numerical controller 17 and the servomotor SM, and an upload unit for uploading the servo data monitored by the monitoring unit to the host computer device PC via the network unit NW. The host computer device PC has a diagnosis and maintenance unit for diagnosing the NC machine tool NC based on the uploaded servo data.

According to this embodiment, the operator can know the diagnosis result of a plurality of NC machine tools NC #1 . . . NC #n with one host computer device PC, and thus there is no need to dispose an operator for each NC machine tool NC. If the host computer device PC is installed separately from multiple NC machine tools NC #1, . . . NC #n, a remote diagnosis and maintenance system for NC machine tools NC is realized. If NC machine tools NC #1 . . . NC #n are installed distributedly in a plurality of factories, a comprehensive diagnosis and maintenance system for NC machine tools NC is realized.

The numerical control information monitored by the monitoring unit of the present embodiment is selected from among servo data including the speed command VCMD output from the numerical controller 17 to the servomotor SM, the torque command TCMD output from the numerical controller 17 to the servomotor SM, the speed feedback SPEED output from the encoder EC provided to the servomotor SM to the numerical controller 17, the position feedback POSF output from the encoder EC to the numerical controller 17, and the difference (error) between the speed command VCMD and the speed feedback SPEED.

Further, the host computer device PC of this embodiment has a parameter rewriting unit for rewriting numerical control parameters relating to the operation of the NC machine tool NC. The parameter rewriting unit proceeds to step S60 and does not rewrite the numerical control parameter when the result of diagnosis by the diagnosis and maintenance unit in step S50 in FIG. 6 is within the allowable range and within the usable range. The parameter rewriting unit proceeds to steps S90 and S100 and rewrites the numerical control parameter when the result of diagnosis by the diagnosis and maintenance unit in step S70 is outside the allowable range and within the usable range. The parameter rewriting unit proceeds to step S80 and outputs a warning when the result of diagnosis by the diagnosis and maintenance unit in step S70 is outside the allowable range and outside the usable range.

The diagnosis and maintenance unit of the present embodiment calculates the backlash amount BL at the meshing location of the worm screw 27 (drive gear) driven by the servomotor SM and the worm wheel 28 (driven gear) meshed with the worm screw 27 (step S40), and diagnoses whether or not the backlash amount BL is within the allowable range (step S50) and whether or not the backlash amount BL is within the usable range (step S70). Then, the parameter rewriting unit of the host computer device PC proceeds to steps S90 and S100 when the calculated backlash amount BL is outside the allowable range and within the usable range (YES in step S70), and rewrites the numerical control parameter based on the backlash amount.

Further, the diagnosis and maintenance unit of the present embodiment analyzes the torque command TCMD in step S40, and calculates the backlash amount BL based on the change in the torque command TCMD and the speed command VCMD shown in FIG. 8.

Also, the monitor management program of this embodiment first drives the servomotor SM in the forward direction as shown in FIG. 5A, and then drives the servomotor SM in the reverse direction as shown in FIG. 5C. The diagnosis and maintenance unit calculates the backlash amount BL (FIG.

5B) in the reverse direction related to the drive of the servomotor SM in the forward direction.

Further, the worm wheel 28 that is the driven gear of the present embodiment is larger than the worm screw 27 that is the drive gear, and the worm screw 27 rotates a plurality of times while the worm wheel 28 makes one rotation. The monitor management program downloaded to the numerical controller 17 drives the servomotor SM in the forward and reverse directions at a plurality of locations R1, . . . Rm of the worm wheel 28 shown in FIG. 4. The diagnosis and maintenance unit of the host computer device PC calculates backlash amounts BL1 . . . BLm at a plurality of locations R1 . . . Rm of the worm wheel 28, respectively, and based on the plurality of backlash amounts BL1 . . . BLm, diagnoses and maintains the NC machine tool NC.

Further, the diagnosis and maintenance unit of the present embodiment levels the monitored torque command TCMD as shown in FIGS. 11 to 14, determines the time t8 at which the leveled torque command TCMD continuously increases or decreases a plurality of times, and calculates the amount of change over time in the backlash amount BL based on the difference between the previously determined time (t4–t3) (FIG. 8) and the later determined time (t4–t3).

Further, the worm screw 27 of the present embodiment is a drive gear, the worm wheel 28 is a driven gear, the worm wheel 28 is coaxially mounted and fixed to the rotary table 12, and the worm screw 27 transmits the driving force of the servomotor SM to the rotary table 12.

Next, a variation of a calculation logic of the backlash amount BL executed in step S40 described above will be described.

FIG. 15 is a graph showing a time change in the torque command TCMD in the variation. In this variation, the backlash amount BL is calculated by a calculation logic called a torque limit skip function. As a calculation logic, first, the speed command VCMD is set to a positive value, and the servomotor SM is driven in the forward direction. At this time, the torque command TCMD is set to a positive value as shown in FIG. 15.

Next, a dwell that sets the speed command VCMD to zero is executed for a predetermined period from time t9 to time t10.

Next, the speed command VCMD is set to a negative value, and the servomotor SM is driven in the reverse direction. The torque command TCMD suddenly decreases to a negative value and reaches a rising peak at a later time t11. The worm screw 27 is activated and starts to rotate counterclockwise, and an operation of reducing backlash is performed. The torque command TCMD that is a negative value becomes substantially constant after the time t11 immediately after the time t10. In a substantially constant condition mentioned here, the torque command TCMD repeatedly increases and decreases. When the substantially constant condition ends, the torque command TCMD decreases gradually.

When the torque command TCMD reaches a predetermined torque limit value α at time t12 sufficiently after time t10, it is determined that the operation for reducing the backlash has been completed. The torque limit value α is larger than the torque command TCMD at time W. After time t12, the program moves to the next block program.

Since the torque limit skip function is a function to obtain the position (angle) at time t12 when the torque command TCMD exceeds the torque limit value, the backlash amount BL of the mechanical system is calculated from a moved angle, the feed speed command of the program, and the pitch circle diameter [mm·n] of the worm wheel 28. Alternatively, the amount of change over time of the backlash amount BL is calculated from the difference between the previously detected time (t12–t10) and the later detected time (t12–t10).

According to the variation shown in FIG. 15, after the servomotor SM is driven in the forward direction, the dwell for setting the speed command VCMD to zero is executed before the servomotor SM is driven in the reverse direction. The diagnosis and maintenance unit preliminarily stores a predetermined value (predetermined value apart from zero) larger than the torque command (torque command TCMD at time t11) required for starting the worm screw 27 as a torque limit value α. After the end time of the dwell (time t10), the time t12 at which the monitored torque command TCMD exceeds the torque limit value α is detected. As a result, the backlash amount BL can be calculated more easily than the calculation logic shown in FIG. 8 and FIGS. 11 to 14.

As mentioned above, although embodiment of the present invention has been described with reference to the drawings, the present invention is not limited to the embodiment shown in the drawings. Various modifications and variations can be made to the illustrated embodiment within the same range as the present invention or within an equivalent range. For example, a partial configuration may be extracted from one embodiment described above, another partial configuration may be extracted from another embodiment described above, and the extracted configurations may be combined.

The present invention is advantageously used in a numerical control device such as a machine tool.

REFERENCE SIGNS LIST

11 spindle
12 rotary table
13 spindle drive unit
14 rotary table drive unit
15 spindle support unit
16 rotary table support unit
17 numerical controller
18 tool magazine
21 tool holder
22 tool
24, 25 pinion
26 worm shaft
27 worm screw
28 worm wheel
EC encoder
NC NC machine tool
NW network unit (communication unit)
PC host computer device
SA servo amplifier
SM servomotor
SW switch
TCMD torque command
VCMD speed command
PCMD position command
POSF position feedback
SPEED speed feedback
Ta, Tb, Tc period

What is claimed is:

1. A numerical control machine tool diagnosis and maintenance system, comprising: at least one numerical control machine tool, one host computer device, and a communication unit configured to transmit and receive data between said numerical control machine tool and said host computer device,
wherein:
said numerical control machine tool includes a servomotor as power of the numerical control machine tool, a drive gear that is driven by said servomotor, a driven gear that meshes with said drive gear, and a numerical controller configured to numerically control said servomotor,
said numerical controller has a monitoring unit configured to monitor numerical control information input/output between said numerical controller and said servomotor, and an upload unit configured to upload said numerical control information monitored by said monitoring unit via said communication unit to said host computer device,
said numerical control information monitored by said monitoring unit includes a torque command output from said numerical controller to said servomotor,
said host computer device includes a diagnosis and maintenance unit configured to diagnose said numerical control machine tool based on said numerical control information that is uploaded,
said diagnosis and maintenance unit is configured to execute a monitor management program for first driving said servomotor in a forward direction and then driving said servomotor in a reverse direction,
said diagnosis and maintenance unit is configured to analyze said torque command, and to determine that said driven gear starts to move due to a change in said torque command,
said diagnosis and maintenance unit is configured to obtain an average of plural consecutive points of said torque command to produce a leveled torque command,
said diagnosis and maintenance unit is configured to determine a change time point at which said leveled torque command continuously increases or decreases a plurality of times, and to calculate a backlash amount at a meshing location of said drive gear with said driven gear in a reverse rotation in said reverse direction by multiplying a constant commanded speed by a time that begins at a start time point of starting the driving of said servomotor in said reverse direction and ends at said change time point,
said diagnosis and maintenance unit is configured to determine whether or not said backlash amount is within an allowable range and whether or not said backlash amount is within a usable range, and
said diagnosis and maintenance unit is configured to rewrite a backlash correction value stored in said numerical control machine tool based on said backlash amount when said backlash amount is outside said allowable range and within said usable range.

2. The numerical control machine tool diagnosis and maintenance system according to claim 1, wherein:
the diagnosis and maintenance unit is configured to not rewrite the backlash correction value when the backlash amount is within the allowable range and within the usable range, and
the numerical control machine tool diagnosis and maintenance system is configured to output a warning when the backlash amount is outside said allowable range and outside said usable range.

3. The numerical control machine tool diagnosis and maintenance system according to claim 1, wherein:
said driven gear is larger in diameter than said drive gear and configured to rotate at a predetermined pitch for each rotation of the drive gear,
said monitor management program is configured to drive said servomotor in said forward direction and said reverse direction at a plurality of locations of said driven gear, the locations provided at intervals corresponding to said pitch, and
said diagnosis and maintenance unit is configured to calculate a plurality of said backlash amounts respectively at said plurality of locations, to diagnose and maintain said numerical control machine tool based on the plurality of backlash amounts, and to correct a pitch error of said driven gear.

4. The numerical control machine tool diagnosis and maintenance system according to claim wherein:
said monitoring unit is configured to monitor an initial torque command that is said torque command in an initial use stage of said numerical control machine tool,
said upload unit is configured to upload said initial torque command to said host computer device, and
said diagnosis and maintenance unit is configured to calculate an increment in the backlash amount by relatively comparing said initial torque command with said torque command after at least three months of use from said initial use stage.

5. The numerical control machine tool diagnosis and maintenance system according to claim 1, wherein:
said drive gear and said driven gear are a worm screw and a worm wheel, respectively,
said worm wheel is provided coaxially with a rotary table, and
said worm screw is configured to transmit a driving force of said servomotor via said worm wheel to said rotary table.

6. The numerical control machine tool diagnosis and maintenance system according to claim 1, wherein said host computer device is configured to adjust a state of a mechanical system of said numerical control machine tool to be constant by running-in said numerical control machine tool before executing diagnosis and maintenance of said numerical control machine tool by said diagnosis and maintenance unit.

7. The numerical control machine tool diagnosis and maintenance system according to claim 1, wherein said host computer device is configured to provide a notification of a result of diagnosis and maintenance of said numerical control machine tool by said diagnosis and maintenance unit through an e-mail and/or the Internet.

8. The numerical control machine tool diagnosis and maintenance system according to claim 1, wherein said numerical control information monitored by said monitoring unit further includes servo data selected from among a speed command output from said numerical controller to said servomotor, a speed feedback output from a feedback device provided in said servomotor to said numerical controller, a position feedback output from said feedback device to said numerical controller, and a difference between said speed command and said speed feedback.

9. A numerical control machine tool diagnosis and maintenance system, comprising: at least one numerical control machine tool, one host computer device, and a communication unit configured to transmit and receive data between said numerical control machine tool and said host computer device, wherein:

said numerical control machine tool includes a servomotor as power of the numerical control machine tool, a drive gear that is driven by said servomotor, a driven gear that meshes with said drive gear, and a numerical controller configured to numerically control said servomotor, said numerical controller has a monitoring unit configured to monitor numerical control information input/output between said numerical controller and said servomotor, and an upload unit configured to upload said numerical control information monitored by said monitoring unit via said communication unit to said host computer device, said numerical control information monitored by said monitoring unit includes a torque command and a speed command that are output from said numerical controller to said servomotor, said host computer device includes a diagnosis and maintenance unit configured to diagnose said numerical control machine tool based on said numerical control information that is uploaded, said diagnosis and maintenance unit is configured to execute a monitor management program for first driving said servomotor in a forward direction and then driving said servomotor in a reverse direction, said diagnosis and maintenance unit is configured to analyze said torque command, and to determine that said driven gear starts to move due to a change in said torque command, said monitor management program is configured to execute a dwell that sets said speed command to zero after the driving of said servomotor in said forward direction and before the driving of said servomotor in said reverse direction, said diagnosis and maintenance unit is configured to store, in advance, a predetermined value as a torque limit value, to detect a time point at which said torque command exceeds said torque limit value after said dwell, and to calculate a backlash amount at a meshing location of said drive gear with said driven gear in a reverse rotation in said reverse direction based on said time point, said diagnosis and maintenance unit is configured to determine whether or not said backlash amount is within an allowable range and whether or not said backlash amount is within a usable range, and said diagnosis and maintenance unit is configured to rewrite a backlash correction value stored in said numerical control machine tool based on said backlash amount when said backlash amount is outside said allowable range and within said usable range.

10. The numerical control machine tool diagnosis and maintenance system according to claim 9, wherein:

the diagnosis and maintenance unit is configured to not rewrite the backlash correction value when the backlash amount is within said allowable range and within said usable range, and the numerical control machine tool diagnosis and maintenance system is configured to output a warning when the backlash amount is outside said allowable range and outside said usable range.

11. The numerical control machine tool diagnosis and maintenance system according to claim 9, wherein:

said driven gear is larger in diameter than said drive gear and configured to rotate at a predetermined pitch for each rotation of the drive gear, said monitor management program is configured to drive said servomotor in said forward direction and said reverse direction at a plurality of locations of said driven gear, the locations provided at intervals corresponding to said pitch, and said diagnosis and maintenance unit is configured to calculate a plurality of said backlash amounts respectively at said plurality of locations, to diagnose and maintain said numerical control machine tool based on the plurality of backlash amounts, and to correct a pitch error of said driven gear.

12. The numerical control machine tool diagnosis and maintenance system according to claim 9, wherein:

said monitoring unit is configured to monitor an initial torque command that is said torque command in an initial use stage of said numerical control machine tool, said upload unit is configured to upload said initial torque command to said host computer device, and said diagnosis and maintenance unit is configured to calculate an increment in the backlash amount by relatively comparing said initial torque command with said torque command after at least three months of use from said initial use stage.

13. The numerical control machine tool diagnosis and maintenance system according to claim 9, wherein:

said drive gear and said driven gear are a worm screw and a worm wheel, respectively, said worm wheel is provided coaxially with a rotary table, and said worm screw is configured to transmit a driving force of said servomotor via said worm wheel to said rotary table.

14. The numerical control machine tool diagnosis and maintenance system according to claim 9, wherein said host computer device is configured to adjust a state of a mechanical system of said numerical control machine tool to be constant by running-in said numerical control machine tool before executing diagnosis and maintenance of said numerical control machine tool by said diagnosis and maintenance unit.

15. The numerical control machine tool diagnosis and maintenance system according to claim 9, wherein said host computer device is configured to provide a notification of a result of diagnosis and maintenance of said numerical control machine tool by said diagnosis and maintenance unit through an e-mail and/or the Internet.

16. The numerical control machine tool diagnosis and maintenance system according to claim 9, wherein said numerical control information monitored by said monitoring unit further includes servo data selected from among a speed feedback output from a feedback device provided in said servomotor to said numerical controller, a position feedback output from said feedback device to said numerical controller, and a difference between said speed command and said speed feedback.

* * * * *

UNITED STATES PATENT AND TRADEMARK OFFICE
CERTIFICATE OF CORRECTION

PATENT NO. : 11,209,797 B2
APPLICATION NO. : 16/654247
DATED : December 28, 2021
INVENTOR(S) : Susumu Mikado et al.

It is certified that error appears in the above-identified patent and that said Letters Patent is hereby corrected as shown below:

On the Title Page

Item (71) Applicant:
Line 2, replace "Daito" with --Daito-shi--;

Item (72) Inventors:
Line 1, replace "Nara" with --Nara-shi--;
Line 2, replace "Osaka" with --Osaka-shi--;

Item (73) Assignee:
Line 2, replace "Daito" with --Daito-shi--;

Item (56) References Cited, U.S. PATENT DOCUMENTS:
Line 8, replace "2012/0263851" with --2012/0283851--;

In the Specification

Column 7,
Lines 4 and 5, replace "EC #1 EC #4" with --EC#1 . . . EC#4--;

Column 11,
Line 29, after "diameter", replace "[mm n]" with --[mm · π]--;

Column 12,
Line 67, after "positions", replace "R1 Rm" with --R1 . . . Rm--;

Column 13,
Line 26, after "location", replace "R1 Rm" with --R1 . . . Rm--;

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*

Column 15,
Line 60, after "time", replace "W." with --t11.--;
Line 67, after "diameter", replace "[mm·n]" with --[mm·π]--;

In the Claims

Column 18,
Line 21, (2nd Line in Claim 4), after "claim", insert --1,--.